UNITED STATES PATENT OFFICE.

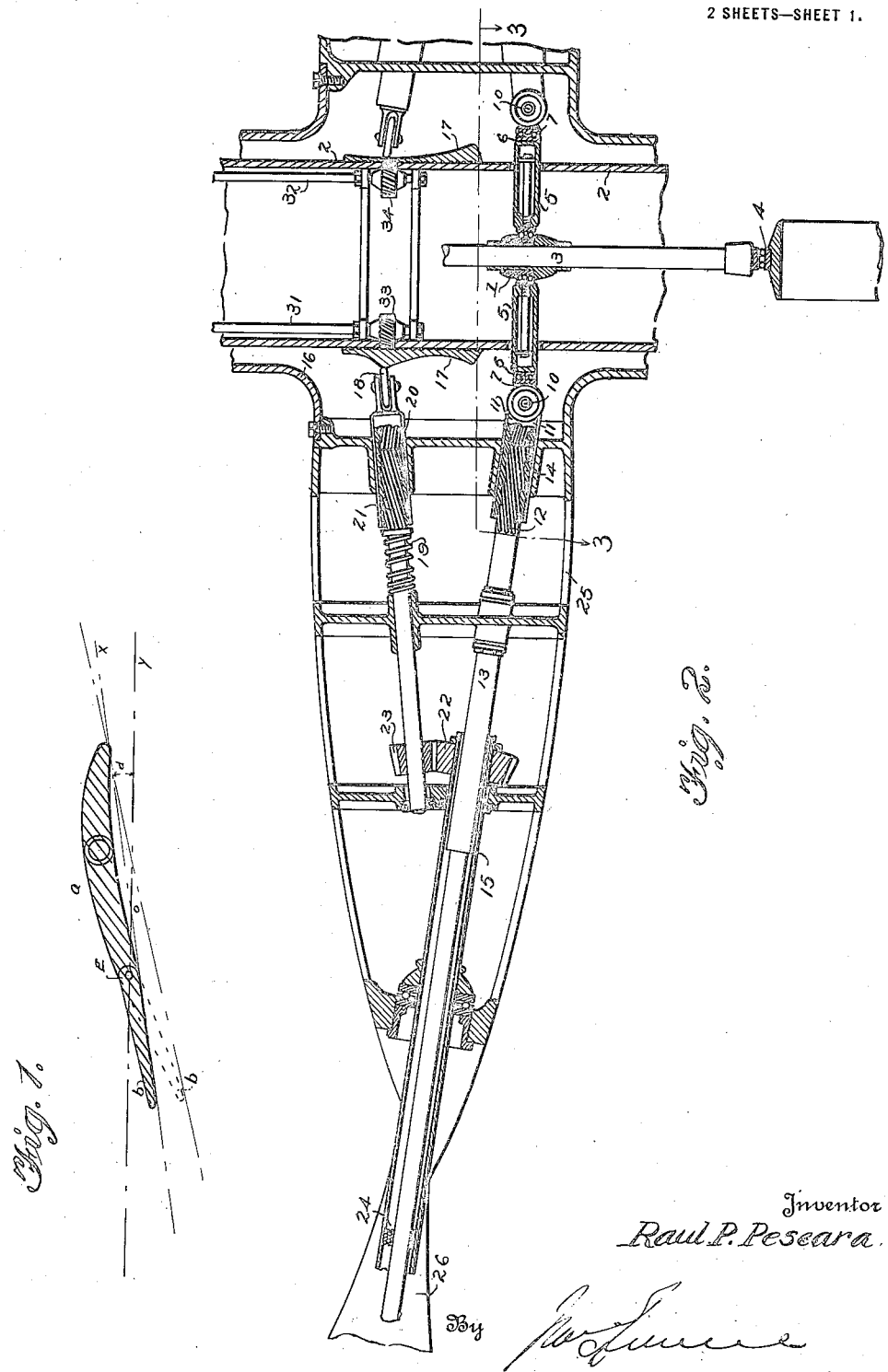

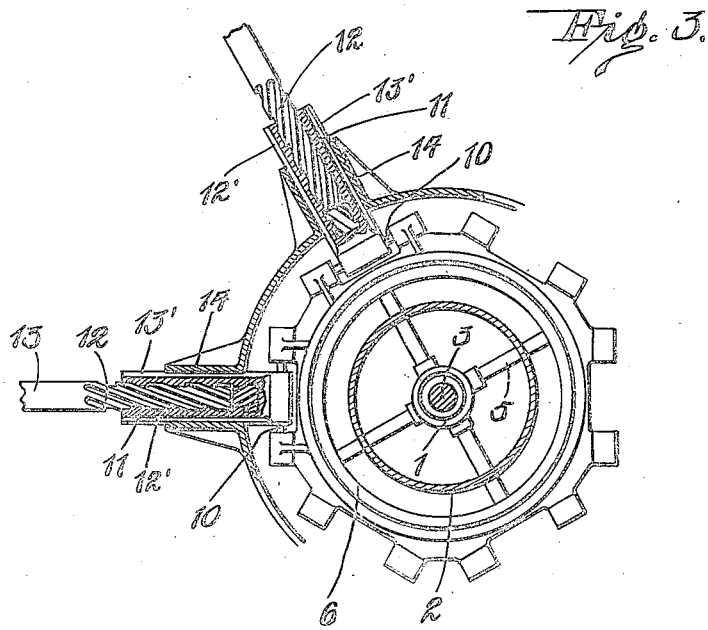
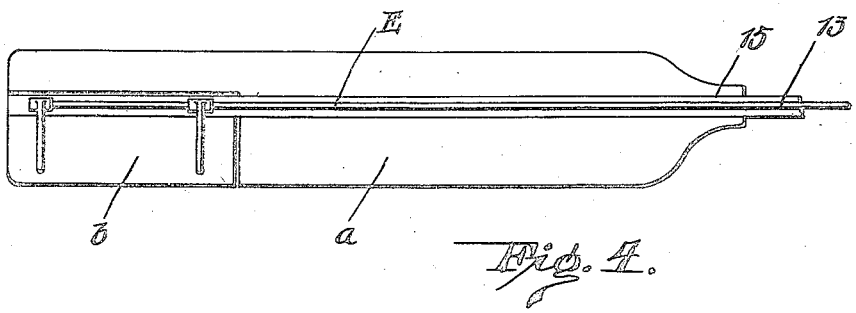

RAUL PATERAS PESCARA, OF BARCELONA, SPAIN.

SYSTEM OF AIRCRAFT PROPELLERS, WITH BLADES OF VARIABLE INCIDENCE AND CAMBERING.

1,427,015.

Specification of Letters Patent. Patented Aug. 22, 1922.

Application filed November 14, 1919. Serial No. 337,919.

*To all whom it may concern:*

Be it known that I, RAUL PATERAS PESCARA, citizen of Republic Argentine, residing at Barcelona, in the county of Barcelona and State of Spain, have invented certain new and useful Improvements in a System of Aircraft Propellers, with Blades of Variable Incidence and Cambering, and do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The system of aircraft propellers with blades of variable incidence and cambering to which this invention relates, has for its object the steering, the control and the stability or steadying of flying machines of the helicopter type.

In the drawings:

Fig. 1 is a transverse section through a propeller blade.

Fig. 2 is a section through the supporting structure of the propeller.

Fig. 3 is a sectional view on line 3—3 of Fig. 2.

Fig. 4 is a view showing the shafts attached to the portions of a blade.

In order to clearly define what is understood by the expressions "variable incidence and cambering" I have shown (Fig. 1, of the drawings) a cross section near the end of the blade of such a propeller, OX being the chord of the arch formed by the side view or profile of the section, and OY the plane of rotation of the blade, the angle shown at $\alpha$ being the incidence of the section under consideration.

As shown, the section is made of two parts, one which constitutes the body of blade $a$, and another part $b$ which can turn relatively to $a$ by means of a horizontal axle E. It will now be readily understood:

1. That if the whole of the blade revolves about its longitudinal axis, the angle of incidence will vary on the total portion of the blade according to the angle of the blade with the plane of rotation.

2. That if the wing turns round its axis E displacing itself from position $b$ to position $b'$, the incidence of the blade will also vary, but only in that section where the cambering device is provided.

It should be borne in mind that this cambering arrangement can be carried out in various equivalent manners but preferably by direct or positive curving of the blade or of a wing section clipped from same, this latter method having been chosen by way of example in the diagram of Fig. 1.

3. Finally, that the movements of the wing section and those of the blade can be combined in such a manner as to obtain a predetermined variation of incidence throughout the whole blade and a different variation in that part of the blade which is provided with the cambering device.

By the expression "propeller of varying incidence and cambering or warping," I mean a propeller of two or more blades, (single plane or multiplane) so constructed that the incidence of all of its blades may be varied during flight and at the same time camber or curve a more or less extensive area of their blade surface, it being also feasible to separate or to combine these two actions, accordingly as the steering of the apparatus may require.

In Fig. 2 of the accompanying drawings is shown in section, an embodiment of certain mechanical devices that can be employed to obtain the results above mentioned.

A disk 1 fitted in tube 2 which constitutes the central axle of the stationary framing of the helicopteral flying machine, is connected at its centre, by means of a ball and socket joint, to a steering shank or rod 3 pivoted to another ball and socket joint 4 and positively operated or controlled by the pilot.

Disc 1 carries arms such as 5, ending in a ring 6 around which revolves a circular crown 7 which has a sliding motion.

This crown has, opposite each blade, the form of a fork the arms of which end in two coaxial cylinders wherein slides freely a shank or rod 10 which is rigidly connected to a tube 11 on the outer walls whereof are formed groves $12^1$—$13^1$ parallel to its axis, and on its inner wall a screw-thread of wide pitch. The said grooves prevent tube 11 from turning around its axis, but as they form a continuation of corresponding grooves formed in bearing 14, the tube is allowed to have a swinging or oscillating motion about its axis.

On the inner thread of tube 11 is screwed the threaded end 12 of another tube 13, fitted inside the longitudinal member of blade 15, within which it can freely revolve. This last mentioned tube 13 is what constitutes the steering axle of the cambering or curving member.

If the pilot turns rod 3 in either direction, the ball bearing constituted by members 6 and 7 will be shifted or displaced from its centre relatively to the rotating axis of the propellers, thus causing parts 11 to reciprocally move on their axis, so that they may advance to and recede from the rotating centre of the propeller. This relative reciprocating motion of member 11 will compel the inner screw 12 to turn around its axis and to impart its motion to the cambering member along the blade by means of axle 13, thus causing the combering member to operate.

By means of the foregoing arrangement the cambering or warping of the propeller blades can be obtained. Now, the variable angle of incidence is obtained in the manner hereinafter explained.

The propeller is mounted on a vertical sleeve or hub 16 swivelling on tube 2, whereon is carried a circular cam 17, thus constituting a sort of steering or controlling cam. A movable roller 18 that can traverse in every direction, exerts a bearing pressure on the said cam, by means of a spring 19, the roller being carried on one end of the shank 20, the other end of which is provided with a screw thread of broad pitch on its inner part. There is a rod 21 which screws into shank or tube 20 and can turn around its axis, according to whether roller 18 approaches or recedes from the axis of the machine, driven by cam 17.

Cam 17 is allowed an upward and downward motion for the purpose of altering the form of variation of the angle of incidence. The said upward and downward motion is controlled by means of axles 31 and 32 on which are fast the pinions 33 and 34 that mesh with a helical groove formed on the inner part of cam 17. The oscillating motion of rod 21 is imparted to the central longitudinal member 15 of the propeller through gearing 22 and 23.

The central longitudinal member 15, of the propeller which is shown as being slightly inclined with regard to the horizontal, may be a tubular structure in which is coaxially fitted the hollow rod 13 with a swivelling motion for the purpose of regulating the cambering of the blade. It is, therefore, of the utmost importance that the swivelling motions of members 13 and 15 should be independent of each other, for which purpose they are united by means of a ball rolling device, such as 24, along the blade.

It will be clearly understood from the foregoing description, that tubes 13 and 15 can freely turn around their common axis, independently of their respective movements.

The whole set of mechanism hereinbefore described is enclosed in a casing or housing 25, made in one casting with hub 16 of the propeller, the blade of which is only partly shown in 26.

Having now fully described and ascertained the nature of my invention what I claim and in respect of which I desire to secure Letters Patent is:

1. A propeller for aircraft comprising blades, a mounting for the blades and means carried by said mounting for varying the angle of incidence and the camber of the blades.

2. A propeller for aircraft including blades, means for varying the angle of incidence and means for varying the camber of the blades.

3. A propeller for aircraft including blades and independently movable means for varying the incidence and the camber of the blades.

4. A propeller for aircraft comprising blades formed with movable portions, the movement of which will vary the camber of said blades, a mounting for the blades, the blades being mounted for axial movement in said mounting, means for controlling the axial movement of the blades and means for moving and controlling the movement of the movable portions of the blades.

5. A propeller for aircraft comprising an axle, a housing rotatably mounted thereon, hollow shafts rotatably mounted in the housing, rods rotatably mounted in the shafts, blades having movable portions, the blades being mounted on the shafts and said movable portions being connected with the rods, and means for rotating the shafts and rods independently of one another.

6. A propeller for aircraft comprising an axle, a housing rotatably mounted thereon, hollow shafts rotatably mounted in the housing, rods rotatably mounted in the shafts, blades having movable portions, the blades being mounted on the shafts and said movable portions being connected with the rods, and means mounted in the axle and housing and connected with the shafts and rods for rotating either the shafts or rods.

7. A propeller for aircraft comprising an axle, a housing rotatably mounted thereon, hollow shafts rotatably mounted in the housing, rods rotatably mounted in the shafts, blades having movable portions, the blades being mounted on the shafts and said movable portions being connected with the rods, members mounted on the end of the rods in the housing, members mounted in the housing and connected with the shafts, and means mounted in the axle for imparting rotative movement to the blades through said members.

In testimony whereof he has signed his name to this specification in the presence of two subscribing witnesses.

M<small>ES</small> RAUL PATERAS PESCARA.

Witnesses:
E<small>L</small> C<small>ONDE DE</small> B<small>AQUER DE</small> R<small>ETAMOSA</small>,
F<small>RANCO</small> P<small>EREZ</small>.